United States Patent [19] [11] 4,084,965
Fry [45] * Apr. 18, 1978

[54] COLUMBIUM POWDER AND METHOD OF MAKING THE SAME

[75] Inventor: Stanley S. Fry, North Chicago, Ill.

[73] Assignee: Fansteel Inc., North Chicago, Ill.

[*] Notice: The portion of the term of this patent subsequent to Feb. 22, 1994, has been disclaimed.

[21] Appl. No.: 756,764

[22] Filed: Jan. 5, 1977

[51] Int. Cl.$^2$ ............ C22C 1/04; H01G 9/05
[52] U.S. Cl. .................. 75/230; 75/.5 AB; 75/.5 BB; 75/174; 75/245; 75/252; 361/305
[58] Field of Search ............ 75/230, 245, 251, 174, 75/.5 AB, .5 BB, 252; 361/305

[56] References Cited

U.S. PATENT DOCUMENTS

| | | | |
|---|---|---|---|
| 3,259,475 | 7/1966 | Burnham | 75/174 X |
| 3,647,415 | 3/1972 | Yanyo et al. | 75/251 |
| 3,655,425 | 4/1972 | Congo et al. | 75/251 X |
| 3,742,369 | 6/1973 | Douglass | 75/245 X |
| 3,748,106 | 7/1973 | Davis et al. | 75/251 X |
| 3,934,179 | 1/1976 | Pierret | 75/245 X |
| 4,009,007 | 2/1977 | Fry | 75/245 X |

*Primary Examiner*—Richard E. Schafer
*Attorney, Agent, or Firm*—Dressler, Goldsmith, Clement, Gordon & Shore, Ltd.

[57] ABSTRACT

Columbium powder capable of producing anodes of improved electrical capacitance is prepared by the addition of phosphorus-containing materials in amounts from about 5 to about 600 ppm based on elemental phosphorus.

18 Claims, No Drawings

COLUMBIUM POWDER AND METHOD OF MAKING THE SAME

BACKGROUND OF THE INVENTION

This invention relates to columbium powders and to anodes prepared therefrom, and specifically to powders capable of producing anodes improved in electrical capacitance.

The use of columbium powders for the preparation of electrodes in electrolytic capacitors is well-known. Columbium powders are known to be suitable as a lower cost substitute for tantalum powders in electrolytic capacitors, particularly in low voltage applications. Columbium electrodes are made by pressing a columbium powder to form a coherent compact, sintering the compact and subsequently forming a dielectric film on the sintered product. In such capacitors, it is desired to have as high a specific capacity (CV/g.) as possible. Tantalum powder, as disclosed in U.S. Pat. No. 3,418,106, is improved with respect to specific capacity when it is first agglomerated, then crushed as tantalum, and finally fabricated into an electrode.

U.S. Pat. No. 3,825,802 discloses improvements in various properties of tantalum capacitors, including specific capacity, by the addition to the tantalum of any of several "dopants", including phosphorus. The range of "dopant" disclosed is from 0.47 to 2.71 atomic percent which, for phosphorus is equivalent to from about 800 to 4600 parts per million and the improvement in specific capacity (with nitrogen, the preferred species) ranges from about 2% (at the lower end of the range) to about 6.3% (at the upper end) when the anode is sintered at 1900° C.

My copending and co-assigned U.S. Pat. No. Application Ser. No. 595,569 filed July 14, 1975, now U.S. Pat. No. 4,009,007 discloses that substantial improvement in the specific capacity of tantalum powder may be obtained by the addition thereto of phosphorus-containing materials in amounts from about 5 to about 400 ppm based on elemental phosphorus.

SUMMARY OF THE INVENTION

In accordance with the present invention, a columbium powder capable of producing capacitors of improved specific capacity is prepared by the addition to a columbium powder of a small amount of a phosphorus-containing material in the range from about 5 to about 600 ppm based on elemental phosphorus. In the preferred embodiment of this invention, the addition of phosphorus-containing material is combined with the agglomeration of the columbium powder as described below.

It is necessary, in accordance with this invention, that a phosphorus-containing material be added to the columbium powder. When phosphorus is present in a columbium powder as an incidental impurity, either carried over from the original ore or introduced as an impurity in the chemicals used in the normal preparation of the columbium powder, the results of this invention are not obtained.

The preferred phosphorus-containing materials are the inorganic phosphate salts, such as ammonium, sodium, potassium, calcium, barium and lead orthophosphates, ammonium mono-hydrogen orthophosphate, ammonium di-hydrogen orthophosphate, sodium mono-hydrogen orthophosphate, sodium di-hydrogen orthophosphate, and potassium di-hydrogen orthophosphate. Other suitable phosphorus-containing materials include elemental phosphorus, metallic phosphides, phosphorus oxides and acids, and organic phosphorus-containing materials, such as alkyl phosphates.

Phosphate materials containing no metallic cations, such as ammonium mono-hydrogen orthophosphate, ammonium dihydrogen orthophosphate and phosphoric acid, are particularly preferred because they do not introduce other metals into the columbium powder with possible adverse effects on the d.c. leakage and breakdown voltage properties of the anodes produced therefrom.

Additionally, it has been found that when the preferred phosphorus-containing materials are added to columbium powder and the powder is thereafter pressed and sintered and anodized in phosphoric acid at a temperature below about 10° C., a further improvement is obtained in that the d.c. leakage at low voltage (e.g. 20 volts) is substantially reduced.

The phosphorus-containing material may be added to the columbium powder in a dry state, but is preferably added in the form of a solution (in an aqueous or partially aqueous solvent) or in the form of a slurry. The material may be added to the columbium powder in the desired proportion or it may be added initially in a master blend containing substantially more phosphorus than desired in the final material and thereafter blended with additional columbium powder to produce the desired final composition.

The columbium powder may be agglomerated or unagglomerated at the time the phosphorus-containing material is applied thereto; and if unagglomerated, it may be thereafter agglomerated or not, as desired. The columbium powders may, if desired, be in hydride form at the time the phosphorus-containing material is added and be reduced to metallic form in subsequent treatment.

EXAMPLES 1 AND 2

An electron beam melted columbium ingot was hydrided in hydrogen gas, milled to powder form, and then degassed in a vacuum to remove hydrogen and reconvert the powder to metallic columbium.

The thus treatd columbium powder was separated into two portions, one of which (Example 1) was not treated with any additive, and the other of which (Example 2) was treated with an aqueous solution of ammonium dihydrogen orthophosphate in an amount which provided, after drying, 300 parts per million of elemental phosphorus.

Both the treated and untreated portions of the powder were then agglomerated in vacuum at 1200° C. for 60 minutes and then milled to pass through a 35 mesh screen.

The control powder (Example 1) and the ammonium dihydrogen orthophosphate-containing powder (Example 2) were formed into 0.5-gram anodes; and the anodes were sintered for 30 minutes at 2000° C. in a cold-wall, vacuum sintering furnace ($10^{-5}$ Torr absolute pressure), and then were tested for density and specific capacity (CV/g.) and d.c. leakage.

The testing procedure involved anodizing the sintered anodes in 0.1% phosphoric acid in water. Anodizing was carried out at a current density of 35 milliamps per gram and at a temperature of about 20° C. until 100 volts was reached. The anodes were held at 100 volts for 2 hours.

The formed anodes were washed in de-ionized water and then dried in clean air at 105° C. They were then soaked in 10% phosphoric acid for 30 minutes. The capacitance was measured on the anode immersed in 10% phosphoric acid employing a type 1611B General Radio Capacitance Test Bridge with an a.c. signal of 0.5 volts and a d.c. bias of 3 volts. The d.c. leakage was tested at 70 volts. The results were as follows:

| Ex. | Density (g/cc) Pressed | Density (g/cc) Sintered | Shrinkage (%) | D.C. Leakage ($\mu$a) | CV/gm (mf-v/gm) |
|---|---|---|---|---|---|
| 1 | 4.09 | 6.42 | 14.1 | 149 | 2253 |
| 2 | 3.73 | 6.12 | 15.6 | 130 | 3164 |

The variation in pressed density between the two samples was due to an equipment limitation since a non-standard die was employed to press the 0.5 gram anodes. While the density difference may be expected to have an effect on the CV/gm values, it is not enough to account for the large increase obtained in the phosphorus-containing sample. This conclusion is confirmed in the further Examples in which samples of identical pressed densities were compared.

EXAMPLES 3 AND 4

An electron beam melted columbium ingot was hydrided in hydrogen gas, milled to powder form, and then degassed in a vacuum to remove hydrogen and reconvert the powder to metallic columbium. The powder has a Fisher Sub-Sieve Size (FSSS) of 5.1 microns.

The thus treated columbium powder was separated into two portions, one of which (Example 3) was not treated with any additive, and the other of which (Example 4) was treated with an aqueous solution of ammonium mono-hydrogen orthophosphate in an amount which provided, after drying, 300 parts per million of elemental phosphorus.

Both the treated and untreated portions of the powder were then agglomerated in vacuum at 1200° C. for 60 minutes and then milled to pass through a 35 mesh screen.

The control powder (Example 3) and the ammonium mono-hydrogen orthophosphate-containing powder (Example 4) were formed into 0.5-gram anodes by pressing the powder to a density of 5.3g/cm$^3$. The anodes were sintered for 30 minutes at 1800° C. in a cold-wall, vacuum sintering furnace (10$^{-5}$ Torr absolute pressure), and then were tested for density and specific capacity (CV/g.).

The testing procedure involved anodizing the sintered anodes in 0.1% phosphoric acid in water. Anodizing was carried out at a current density of 35 milliamps per gram and at a temperature of about 18° C. until 100 volts was reached. The anodes were held at 100 volts for 2 hours.

The formed anodes were washed in de-ionized water and then dried in clean air at 105° C. They were then soaked in 10% phosphoric acid for 30 minutes. The capacitance was measured on the anode immersed in 10% phosphoric acid employing a type 1611B General Radio Capacitance Test Bridge with an a.c. signal of 0.5 volts and a d.c. bias of 3 volts. The results were as follows:

| Ex. | Density (g/cc) Pressed | Density (g/cc) Sintered | CV/gm (mf-v/gm) | D. C. Leakage ($\mu$a) | Dissipation factor % | CV/gm Increase (%) |
|---|---|---|---|---|---|---|
| 3 | 5.3 | 6.38 | 4256 | 246 | 51 | — |
| 4 | 5.3 | 6.27 | 4665 | 325 | 46 | 9.6 |

As may be seen, a substantial increase in specific capacitance is obtained when the columbium powder has phosphorus added thereto. The high values for d.c. leakage in Examples 3 and 4 (as well as in Examples 1 and 2) are due to the relatively high voltage of the test (70 volts) and to the fact that the anodes were formed at about room temperature rather than at a lower temperature (e.g., 0° to 10° C.), as preferred for columbium anodes.

EXAMPLES 5 AND 6

Columbium powders made in accordance with Examples 3 and 4 each was pressed to a 0.25 gram anode which was sintered at 1750° C. for 30 minutes. Each of the pressed samples was anodizied to 100 volts at 5° C. with phosphoric acid at a concentration of 0.01%.

The samples were then converted to solid columbium capacitors by the attachment of electrodes, treatment with manganous nitrate followed by decomposition of the nitrate to manganous oxide and encasement of the samples into tin-plated copper casings.

The capacitors were tested in a standard test bridge at 0.5 volts and a d.c. bias of 3 volts. The d.c. leakage was tested at 20 volts. The results are shown below, the phosphorus-containing capacitor being designated as "Example 6" and the capacitor without added phosphorus being designated as "Example 5".

| Ex. | Pressed Density (g/cc) | Capacitance device (mf) | Dissipation Factor (%) | D. C. Leakage ($\mu$a) | Capacitance Increase (%) |
|---|---|---|---|---|---|
| 5 | 4.3 | 9.9 | 2.7 | 3.5 | — |
| 6 | 4.3 | 10.7 | 2.4 | 0.6 | 8.0 |

Here again, there is a substantial increase in capacitance obtained in the device made from a phosphorus-containing columbium powder. There is also a substantial decrease in d.c. leakage and a decrease in dissipation factor when the pressed sample is anodized at a low temperature, such as between 0° and 10° C.

It will be understood by those skilled in the art that variations and modifications of the specific embodiments described above may be employed without departing from the scope of the invention as defined in the appended claims.

What is claimed is:

1. A columbium powder containing an added phosphorus-containing material in an amount equivalent to from about 5 to about 600 parts per million of elemental phosphorus.

2. A columbium powder in accordance with claim 1 in which the powder particles are agglomerated.

3. A columbium powder in accordance with claim 1 in which the powder particles are unagglomerated.

4. A columbium powder in accordance with claim 2 in which said phosphorus-containing material is added to said columbium powder prior to the agglomeration thereof.

5. A columbium powder in accordance with claim 2 in which said phosphorus-containing material is added to said columbium powder after the agglomeration thereof.

6. A columbium powder in accordance with claim 1 in which the phosphorus-containing material is free of metallic cations.

7. A columbium powder in accordance with claim 1 in which at least a major portion of said phosphorus-containing material is added in the form of an orthophosphate compound of the group consisting of ammonium orthophosphate, ammonium hydrogen orthophosphate, ammonium di-hydrogen orthophosphate, and orthophosphoric acid.

8. A columbium anode prepared by pressing and sintering the columbium powder of claim 1.

9. A columbium anode prepared by pressing columbium powder into the shape of an anode, adding to said pressed columbium powder a phosphorus-containing material in an amount equivalent to from about 5 to about 600 parts per million of elemental phosphorus, and thereafter sintering said pressed columbium powder.

10. A method for improving a columbium powder which comprises adding to said powder an amount of phosphorus-containing material corresponding to from about 5 to about 600 parts per million of phosphorus.

11. A method in accordance with claim 10 in which said columbium powder is agglomerated prior to the addition of said phosphorus-containing material.

12. A method in accordance with claim 10 in which said phosphorus-containing material is added to said powder prior to agglomeration.

13. A method of improving a columbium powder which comprises adding to said powder while it is in the form of columbium hydride an amount of phosphorus-containing material corresponding to from about 5 to about 600 parts per million of phosphorus and thereafter converting said columbium hydride to metallic columbium.

14. A method in accordance with claim 13 in which said columbium hydride is converted to metallic columbium during agglomeration.

15. A method in accordance with claim 13 in which said columbium hydride is converted to metallic columbium and thereafter agglomerated.

16. A method of forming an improved columbium anode which comprises pressing and sintering the columbium powder of claim 1.

17. A method of forming an improved columbium anode which comprises pressing a columbium powder into the shape of an anode, adding to said pressed columbium powder a phosphorus-containing material in an amount equivalent to from about 5 to about 600 parts per million of elemental phosphorus, and thereafter sinterng said pressed columbium powder.

18. The method of claim 17 wherein said sintered and pressed columbium powder is thereafter anodized in dilute aqueous phosphoric acid at a temperature between 0° and 10° C.

* * * * *